United States Patent [19]
Spark et al.

[11] 3,977,369
[45] Aug. 31, 1976

[54] ORBITAL DISPLACERS

[75] Inventors: Ian J. Spark, Trafalgar; Joseph M. Rossin, Glenroy; Robert Sincich, Newborough, all of Australia

[73] Assignee: Gippsland Institute of Advance Education, Churchill, Australia

[22] Filed: July 2, 1974

[21] Appl. No.: 485,287

[30] Foreign Application Priority Data
July 2, 1973 Australia............................ 3904/73
Sept. 18, 1973 Australia............................ 4894/73
Jan. 10, 1974 Australia............................ 6215/74

[52] U.S. Cl............................. 123/8.43; 123/52 R; 123/66
[51] Int. Cl.².................... F02B 53/08; F02B 55/16
[58] Field of Search............... 123/8.43, 8.25, 52 R, 123/66, 68; 418/6, 61

[56] References Cited
UNITED STATES PATENTS

| | | | |
|---|---|---|---|
| 3,318,291 | 5/1967 | Hallenbeck et al. | 123/8.43 |
| 3,358,653 | 12/1967 | Grimm | 123/8.43 |
| 3,398,727 | 8/1968 | Vincent | 123/8.25 X |
| 3,572,985 | 3/1971 | Runge | 123/8.43 X |

Primary Examiner—Charles J. Myhre
Assistant Examiner—William C. Anderson
Attorney, Agent, or Firm—Donald D. Jeffery

[57] ABSTRACT

An everted orbital displacer is formed by locating the working cavities within the orbiting piston. If the piston is double sided, a normal orbital displacer may have its working cavities located on the outer periphery of the piston, and the combination of the two displacers used as a two stage compressor, pump or motor or as the basis of a 2 stroke or 4 stroke internal combustion engine.

9 Claims, 16 Drawing Figures

ORBITAL DISPLACERS

The present invention relates to improvements in orbital displacers, and in particular to the use thereof in 2 stroke and 4 stroke internal combustion engines and double acting orbital pumps and compressors.

Advantages of an orbital displacer, and so an internal combustion engine based thereon, include a very compact unit with high ratios of swept volume/total volume and swept volume/total weight and, due to the absence of connecting rods, no secondary out-of-balance, thus making possible perfect static and dynamic balance.

An orbital displacer is especially suitable as the basis of a two stroke engine since the exhaust and transfer ports can be made to operate asymmetrically with respect to the bottom dead centre (B.D.C.) position of the orbiting piston. Thus the orbiting piston can be used to first open and then close the exhaust port before the transfer port, as compared with a reciprocating engine, in which, if the exhaust port opens before the transfer port, then it must close after the transfer port. Hence the orbital two stroke engine avoids (at least partially) one of the major problems of the reciprocating two stroke engine; namely, the loss of fuel/air mixture through the exhaust port during the scavenging process. Furthermore with an orbital two stroke engine it is possible to locate and shape a port so that it opens and closes at different angles before and after B.D.C. respectively.

According to the present invention, there is provided an everted orbital displacer comprising a housing having a plurality of working cavities defined by an external peripheral wall of a stationary internal housing and opposed stationary end walls, an internal peripheral surface of an orbiting piston, said piston being supported by three or more eccentrics so that rotation of said eccentrics is accompanied by orbital motion of said piston and a change in volume of each of said working cavities, radially disposed vanes sliding in slots in the internal housing and grooves in the end plates and slidably connected to said piston whereby orbital motion of said piston causes said vanes to execute simple harmonic motion, and ports disposed in said outer housing to enable fluid to be introduced to and exhausted from said working cavities as the eccentrics rotate.

Slots may be cut in the orbiting piston, said slots being inclined in the orbital plane at an angle $\Delta\theta$ to the line joining the T.D.C. and B.D.C. positions of the orbiting piston with respect to eachworking cavity and acting as valves to expose ports in one or both end plates upon rotation of the eccentrics such that maximum port opening of either the inlet or outlet port occurs at $90°+\Delta\theta$ before T.D.C. and the maximum opening of the other port, either outlet or inlet respectively occurs at $90°-\Delta\theta$ after T.D.C., including the case where any straight peripheral edge of the orbiting piston constitutes half a slot available to open and close a port.

The present invention also includes the combination of the above disclosed everted orbital displacer within a normal orbital displacer the combination being formed by extending the vanes past the outer surface of the orbiting piston, the working cavities of the normal displacer being defined by the stationary inner wall of the housing, the opposed end walls, the extended vanes and the external peripheral surface of the orbiting piston.

Thus, both the innermost and outermost surfaces of a single double sided piston may be used in separate displacers. Since the swept volume of the outermost displacer will be greater than that of the innermost everted orbital displacer, the former can be used as a precompression stage in either an air compressor or an internal combustion engine.

For example the double sided orbiting piston may precompress the fuel/air mixture and positively displace it into the combustion spaces of the engine (where power may be developed by means of the two stroke cycle).

Alternatively the outermost displacer may be used in series with the everted orbital displacer to form the second stage of an air motor or air compressor. On the other hand if the normal and everted orbital displacers are connected in parallel a double acting hydraulic pump or motor could be constructed. The effective swept volume of this double acting pump or motor would be the sum of the swept volumes of the normal and the everted orbital displacers.

When the orbital displacer is used as the basis of an air compressor, air motor, hydraulic pump or hydraulic motor the orbiting motion of the piston can be used to open and close inlet and outlet ports in one or both end plates at the appropriate position of the eccentrics, thus making valves unnecessary.

If the everted orbital displacer is used as the basis of a 4 stroke engine then the stems of the inlet and exhaust valves can be made to converge towards the axis of the displacer. Hence a single camshaft containing only an exhaust cam and inlet cam can be used to directly open all valves. It is envisaged that bucket tappets would be interposed between the cam and the tails of the valves.

But in order that the invention may be more clearly understood, several preferred embodiments thereof will now be described with reference to the accompanying drawings, wherein.

Although the normal and everted orbital displacers described below each have four cavities, the same principles can be applied to displacers with any number of cavities in excess of one. Furthermore the porting arrangement required when only the inner or outer side of the orbiting piston is used can be readily derived from the description below.

Figure 1A:
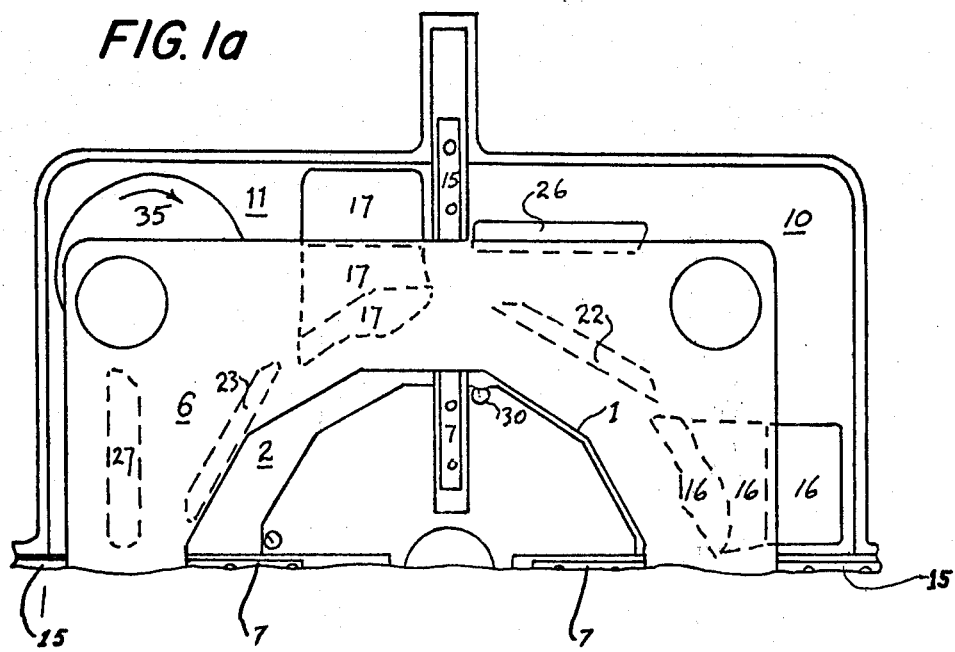
FIG. 1a is a fragmentary, cross-sectional view of a two stroke engine, showing one method of porting.
Figure 1B:
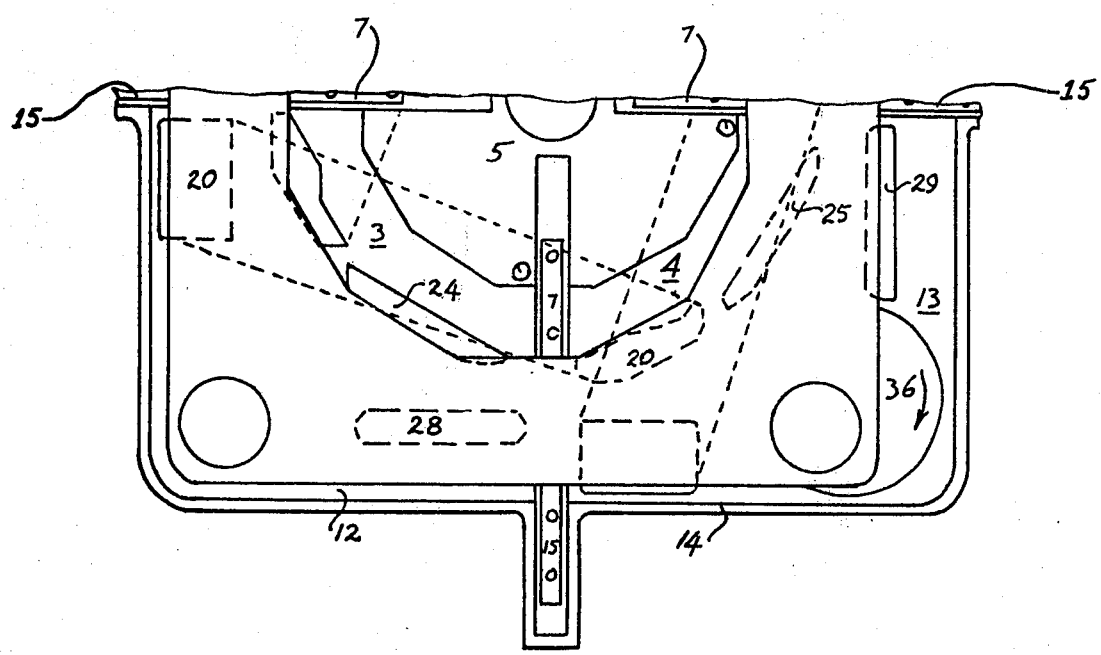
FIG. 1b is a fragmentary, cross-sectional view similar to FIG. 1a and showing the lower half of the engine, with this figure showing a different method of porting.
Figure 2:
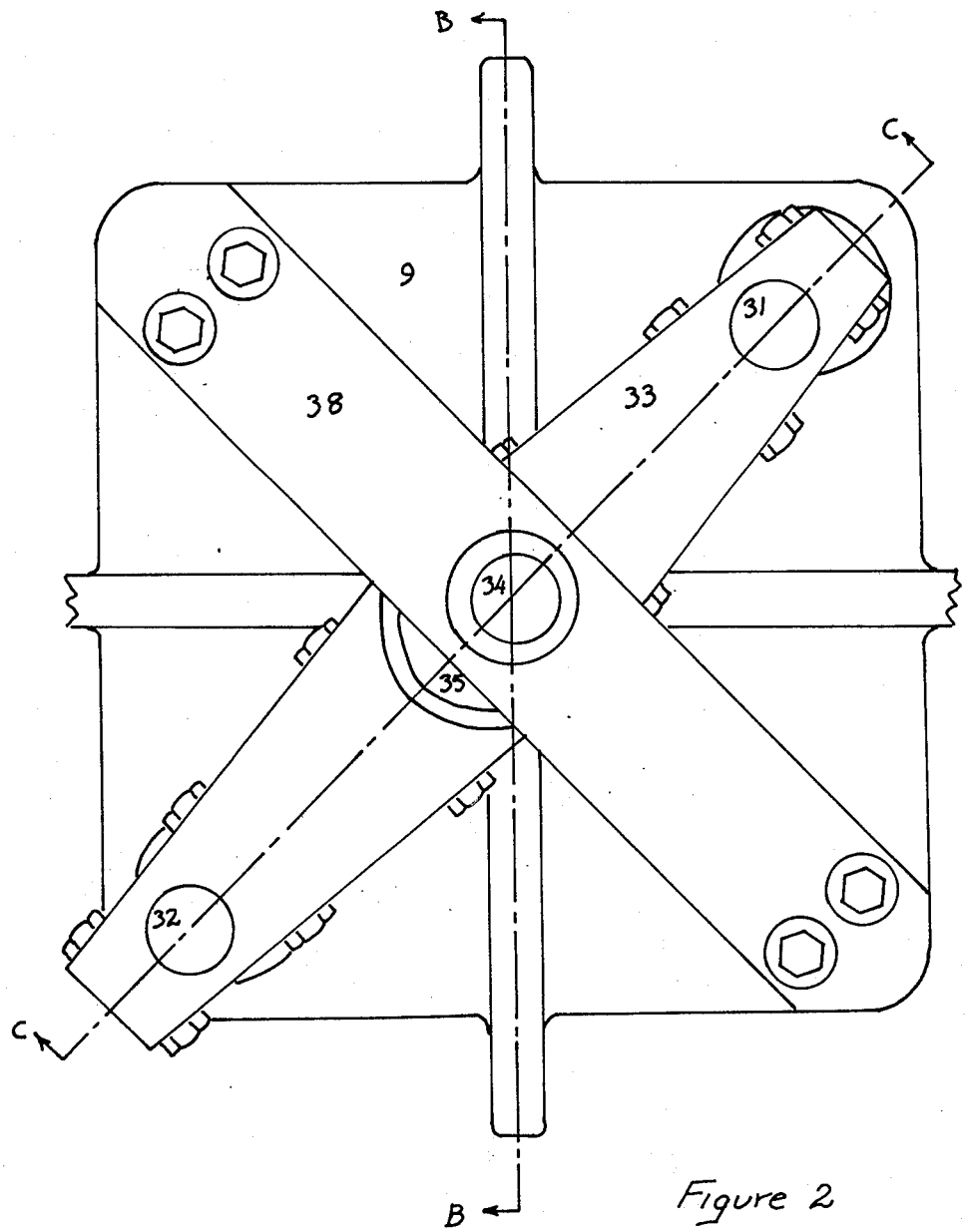
FIG. 2 is a rear view of the motor showing the orbiting link and the rear crankshaft bearing.
Figure 3:
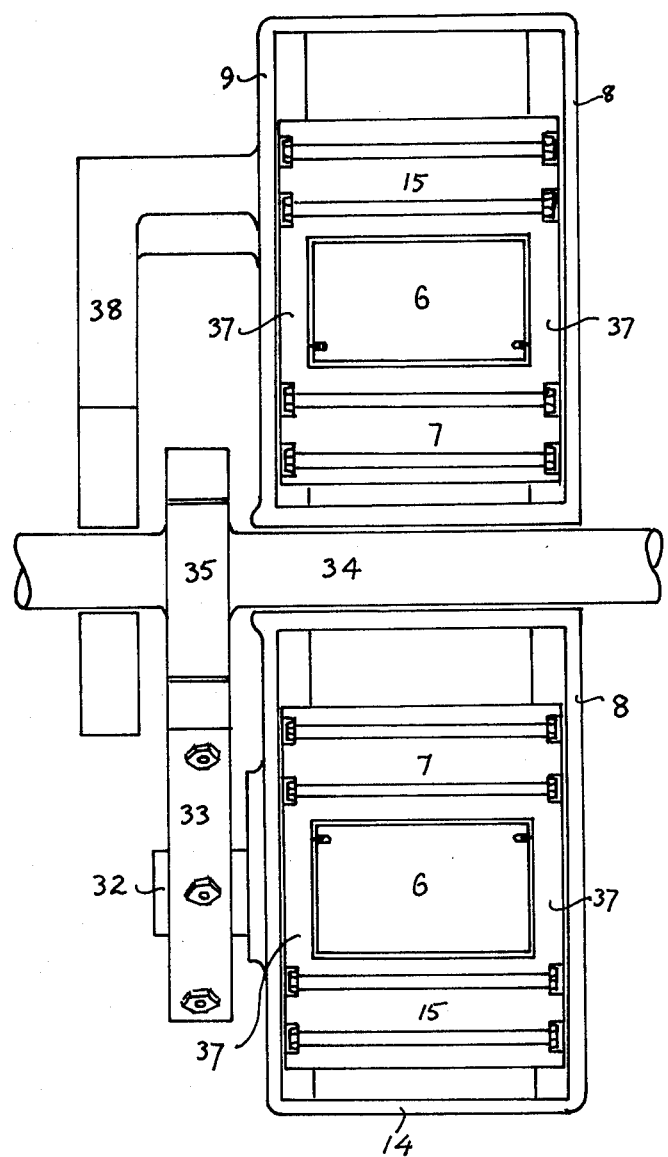
FIG. 3 is the section on the line BB in FIG. 2.
Figure 4:
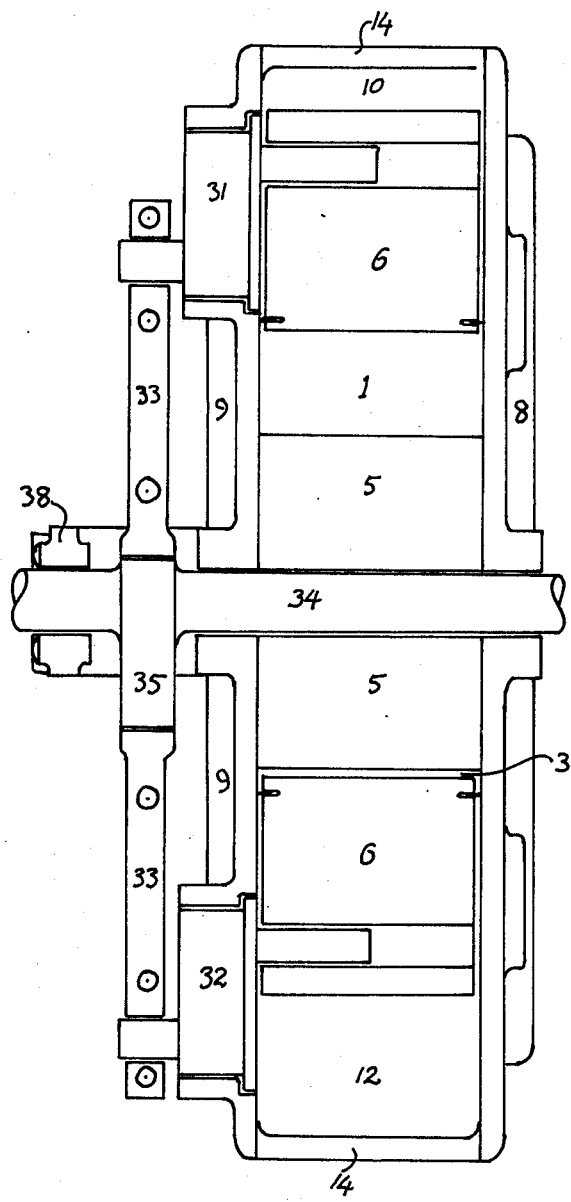
FIG. 4 is the section on the line CC in FIG. 2.

Note that the engine crankshaft shown in FIGS. 1a and 1b and 3 has been rotated 180° in FIGS. 2 and 4.

In FIGS. 1a and 1b, the combustion spaces 1, 2, 3 and 4 of the engine are bounded by the internal casing 5, the internal surface of the double sided orbiting piston 6, the inner section 7 of the sliding vanes, the front end plate 8 and the rear end plate 9.

The pre-compression spaces 10, 11, 12 and 13 of the engine are bounded by the external casing 14, the external surface of piston 6, the outer section 15 of the sliding vanes, the front end plate 8, and the rear end plate 9.

FIG. 1a shows typical locations of the transfer ports 16 and 17 which connect the pre-compression spaces 10 and 11 to the combustion spaces 1 and 2 respectively at the appropriate time. FIG. 1a shows an alternative method of connecting the combustion space 4 via duct 20 to pre-compression space 12 where the piston 6 is lagging by 90°. This latter porting has the advantage that the pre-compression space displaces fuel/air mixture progressively into the combustion space while the latter is around B.D.C. FIGS. 1a and 1b also shows the exhaust ports 22, 23, 24 and 25, via which the combustion products leave the combustion spaces and the inlet ports 26, 27, 28 and 29 to the pre-compression chambers.

At T.D.C., the volume of combustion space 1 is a minimum while the volume of adjacent pre-compression space 10 is a maximum. Both exhaust port 22 and transfer port 16 are closed, while the inlet port 26 is open (having opened at 210° before T.D.C.). The spark plug electrodes 30 have just ignited the compressed fuel/air mixture.

Combustion space 2 is expanding, during the power stroke (viz. 90° after T.D.C.), exhaust port 23 and transfer port 17 are closed, as is inlet port 27, the fuel/air mixture in the pre-compression space 11 is being compressed.

The volume of combustion space 3 is a maximum (i.e. at B.D.C.) while the volume of adjacent pre-compression space 12 is a minimum. The exhaust port 24 has opened (at 115° after T.D.C.) followed by the transfer port (at 125° after T.D.C.), the latter allowing the pre-compressed fuel/air mixture to flow from pre-compression space 11 to combustion space 3.

Combustion space 4 is contracting, during the compression stroke, (viz. 270° after T.D.C.), exhaust port 25 has now closed (at 225° after T.D.C.), followed by the transfer port 20 (at 270° after T.D.C.). Since the precompression space 13 is expanding and the inlet port 29 is open (having opened at 150° after T.D.C.) fuel/air mixture is sucked into this space.

FIG. 3 shows that each vane in the engine consists essentially of four parts: an outer portion 15 of the vanes seals the pre-compression spaces 10, 11, 12 and 13; an inner portion 7 of the vanes seals the combustion spaces 1, 2, 3, and 4; and two vane legs 37 link the inner and outer portions 7 and 15 of the vanes. Whereas the vane legs slide in grooves in the end plates 8 and 9, the inner and outer extremities of the vanes slide in slots in the inner 5 and outer 14 casings respectively.

Although the double sided orbiting piston and vanes are depicted as being solid (for the sake of simplicity), these components could be made hollow in order to decrease their weight and to allow the passage of coolant.

Although the orbital motion of the double sided piston 6 would cause the portions 7 and 15 of the vanes to execute simple harmonic motion, auxiliary slipper blocks sliding in grooves in the side of the piston 6 could be added if required. It should be noted that the sinusoidal motion of the vanes could be utilised to pump fluids (e.g. oil, petrol, water or air), through the engine.

The front of the crankshaft 34 is supported by a bearing located in the inner casing of the engine 5, whereas the rear of the crankshaft 34 is supported by a bearing located in the bridging member 38. Holes (not shown) can be provided in the inner casing for the circulation of either gaseous or liquid coolant.

FIG. 4 shows that power is transmitted from the double sided piston 6 to two double throw eccentrics 32 and 31, and then via the second throw of the eccentrics to an orbiting link 33, and finally from link 33 to the crankshaft 34 by means of an eccentric 35 on the latter. Since the two throws on each eccentric are diametrically opposite, the inherent out-of-balance of the crankshaft 34 and orbiting link 33 can be used to compensate the inherent out-of-balance of the double sided orbiting piston. Thus static balance can be achieved. The figures depict the special case where the out-of-balance mass of the crankshaft 34 and the orbiting link 33 is equal to that of the double sided piston 6. In this case static balance can be achieved by making the two throws of the double eccentrics 31 and 32 equal. More than two power eccentrics may be used if desired.

Since the power eccentrics 31 and 32 support the rear of the double sided piston 6, two single throw eccentrics 35 and 36 are used to support the front of piston 6 (see FIGS. 1a and 1b). However these auxiliary eccentrics are not essential.

FIG. 4 shows that whereas the output of the motor is taken from the rear of the crankshaft, accessories such as fan, water pump, etc. can be driven either from the front of the crankshaft 34 or from the primary axes of the two support eccentrics 35 and 36.

Full dynamic balance is achieved by fitting an out-of-balance flywheel to the rear of the crankshaft and adjusting the out-of-balance of the latter, the piston 6 (and eccentrics) crankshaft and orbiting link so that the resultant couples about axes perpendicular to the axis of the crankshaft are all zero. Alternatively the out-of-balance flywheel is fitted to the front of the crankshaft with the advantage of a lighter engine. Alternatively, dynamic balance is achieved by fitting an orbiting link on both ends of the crankshaft.

Figure 5:
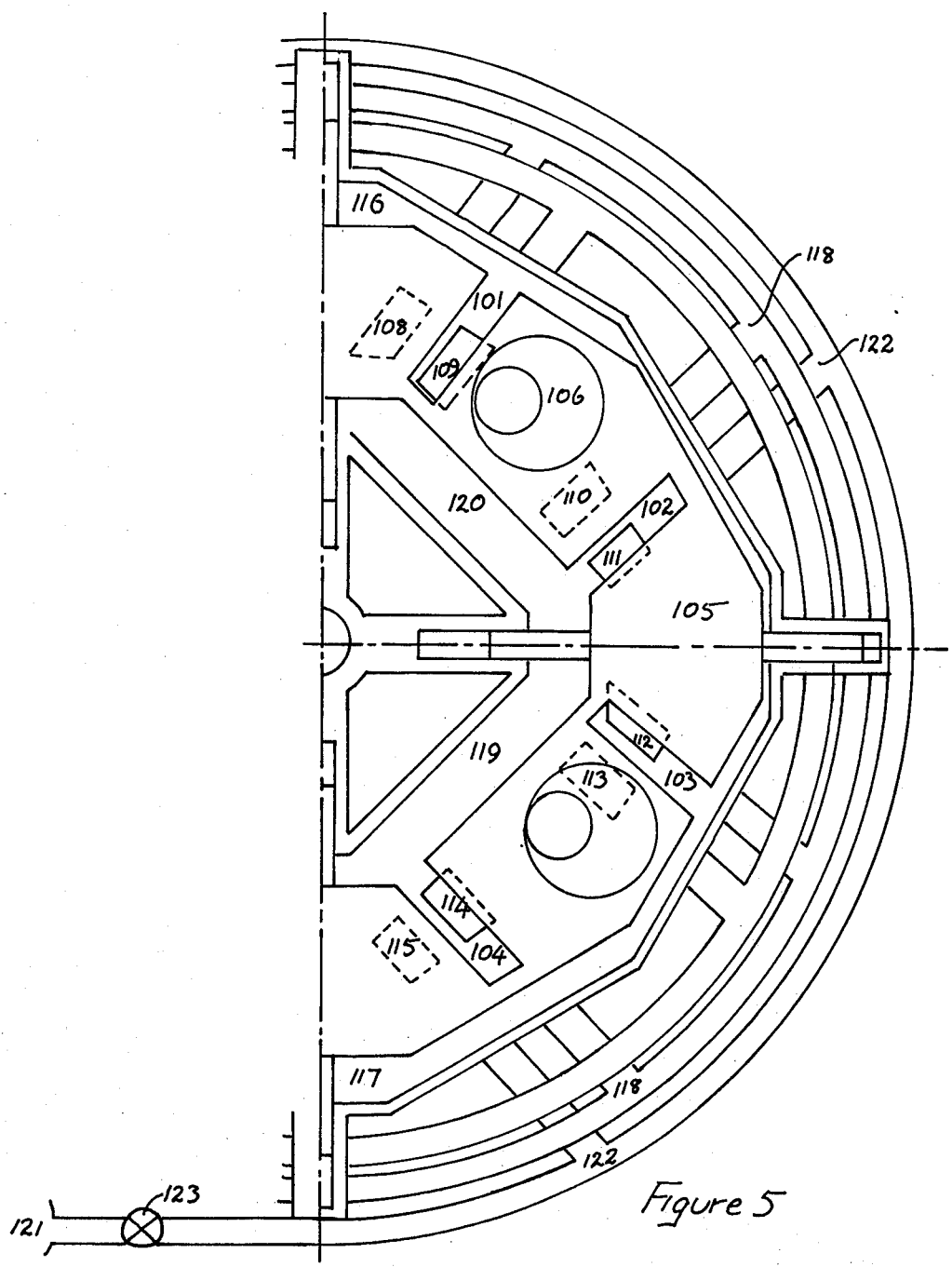
FIG. 5 shows a cross-section through co-axially and co-planarly combined normal and everted orbital displacers arranged to operate as a two stage air compressor.

In the two stage compressor shown in FIG. 5, no valves are necessary. Slots 101, 102, 103 and 104 are machined in either one or both sides of the orbiting piston 105 that is adjacent to the end plates. The width of the slots is preferably equal to the throw of the eccentrics 106 and 107. The sides of the slots are parallel to a line joining T.D.C. and B.D.C. of any point on the piston (i.e. parallel to the throw of the eccentrics when the volume of the cavity considered is either maximum or minimum). For each slot in the piston an inlet port hole and an outlet port hole is located in the adjacent end plate. Both the width and distance separating port holes is preferably equal the throw of the eccentrics. Port holes 108, 109, 110, 111, 112, 113, 114 and 115 are connected to either the inlet or outlet manifold. Although in a two stage compressor an intercooler may be interposed between the outlet manifold of the first stage and the inlet manifold of the second stage, FIG. 5 shows the first stage outlet ports 108 and 112 and the second stage inlet ports 110 and 114 connected to a common manifold 118.

Clockwise rotation of the eccentrics causes the volume of primary cavity 116 to increase as inlet port hole 109 is opened by slot 101 in orbiting piston 105, allowing air from atmosphere to flow into the cavity. At the same time, the volume of primary cavity 117 is decreasing while outlet port hole 112 is opened by piston slot 103 so that air is expelled into the manifold 118 linking the primary and secondary stages.

As the volume of secondary cavity 119 is increasing while the inlet port 114 is open, air is drawn from the linking manifold 118.

As the volume of secondary cavity 120 is decreasing while the outlet port 111 is open, air is delivered from this cavity to an appropriate reservoir 121 via second stage outlet manifold 122. As the operation of the compressor is mechanically reversible, a one-way valve 123 is desirable between the outlet manifold of second stage 122 and high pressure reservoir 121 to prevent the compressor rotating backwards when the driving motor is switched off.

Power is transmitted from a co-axial shaft via an attached primary gear to four idler gears which in turn transmit power to four tertiary gears attached to the eccentrics. The compressor could be statically balanced by attaching appropriate counter weights to the primary shaft and the shafts of the tertiary gears. Dynamic balance could be achieved by disposing the balance weights on either ends of the primary and tertiary shafts so that (with the exception of the driving couple) the resultant couples acting on an unsupported compressor would be zero. For the purpose of balancing, half the totalweight of the vanes should be added to the total weight of the orbiting piston and the effective out-of-balance weight of the crankshaft and/or supporting eccentrics.

A single stage orbital compressor of the form typified by primary cavities 116 and 117 may be incorporated around the periphery of a 2 stroke or 4 stroke internal combustion engine whose working cavities replace the secondary everted orbital compressor cavities 119 and 120. The compressor could be used to supercharge the engine either via a common manifold or via individual manifolds connecting individual compressor cavities to individual engine cavities.

Further a single everted orbital compressor of this form could be incorporated in the centre of an orbital 4 stroke internal combustion engine whose working cavities replace the primary orbital compressor cavities 116 and 117. In this case the compressor could be used to supercharge the engine either via a common manifold or via individual manifolds connecting each compressor cavity to a pair of adjacent engine cavities (where timing of the latter is almost 360° out of phase).

Although the swept volume of the everted orbital compressor is less than that of the co-axial normal orbital 4 stroke engine, the compressor may still be used to supercharge the engine since the volume of air required by a 4 stroke engine per revolution is only half its swept volume.

Figure 7:
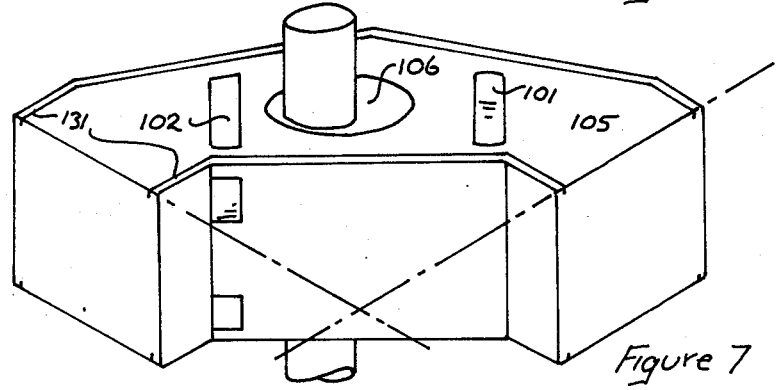
FIG. 7 is a perspective view of a quarter of the double sided orbiting piston showing an alternative arrangement of the slots and end seals.
Figure 8:
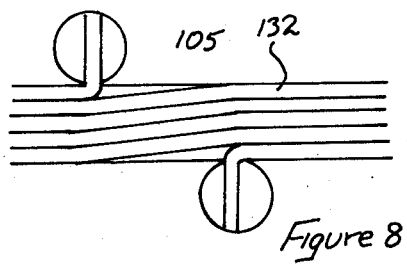
FIG. 8 shows a method of positively locating the ends of a spiral end seal within the orbiting piston.

If the clearance between the end plates and orbiting piston is sufficiently small end seals may be unnecessary, especially in the case of a high speed air motor or air compressor. However two ring seals 131 (either continuous or discontinuous) may be used to reduce extraneous leakage directly between the cavities 116, 117, 119 and 120 and the port holes 108 to 115, but they do not prevent leakage via slots 101 and 102 (or rather ports) in the orbiting piston 105 (see FIG. 7).

Figure 6:
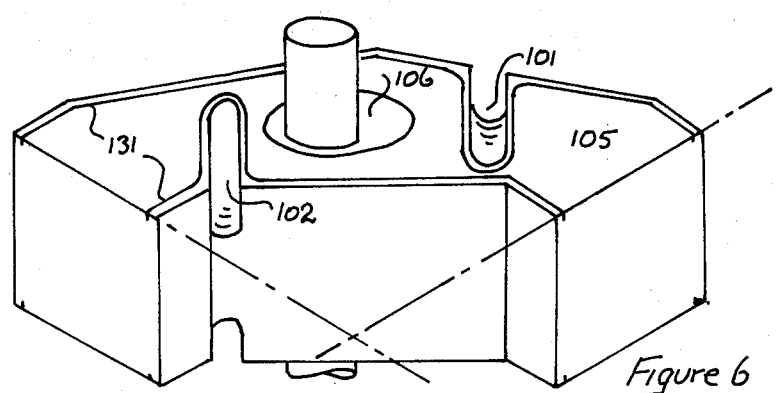
FIG. 6 is a perspective view of a quarter of the double sided orbiting piston showing its slots and the preferred location of the end seals.
Figure 9:
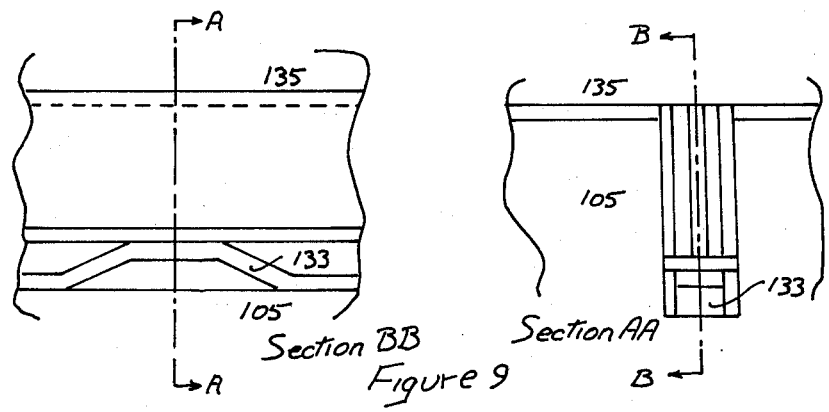
FIG. 9 shows a method of pressing the end seal against the end plate.

Ideally the end seals should lie adjacent both the edge of the orbiting piston and slots in the latter (see FIG. 6). In order to allow the seals shown in FIG. 6 to conform, preferably elastically, to the torturous grooves in the orbiting piston, each consists of a thin strip of elastic material, e.g. spring steel 0.2.mm thick, wound in a spiral around the piston groove with its thin edge parallel to the end plate. Either one or both ends of the spiral are positively located, to prevent them fouling the port holes in the end plate, by pressing the seals 132 against the adjacent end plate 135 by one or more springs 133 interposed between the seal and the bottom of the groove in the orbiting piston 105 (see FIG. 9).

Figure 10:
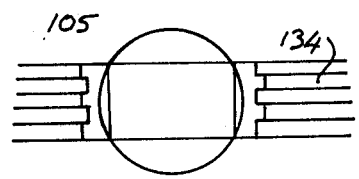
FIG. 10 shows a method of positively locating the ends of the segmented seal within the orbiting piston.

Alternatively, the seals are made of several strips of thin elastic material each at least partially circling the groove in the piston. The ends are located to prevent fouling the port holes in the end plates (see FIG. 10). This segmented seal 134 is pressed against the end plated in the same manner as the spiral seal (see FIG. 9).

Figure 11:
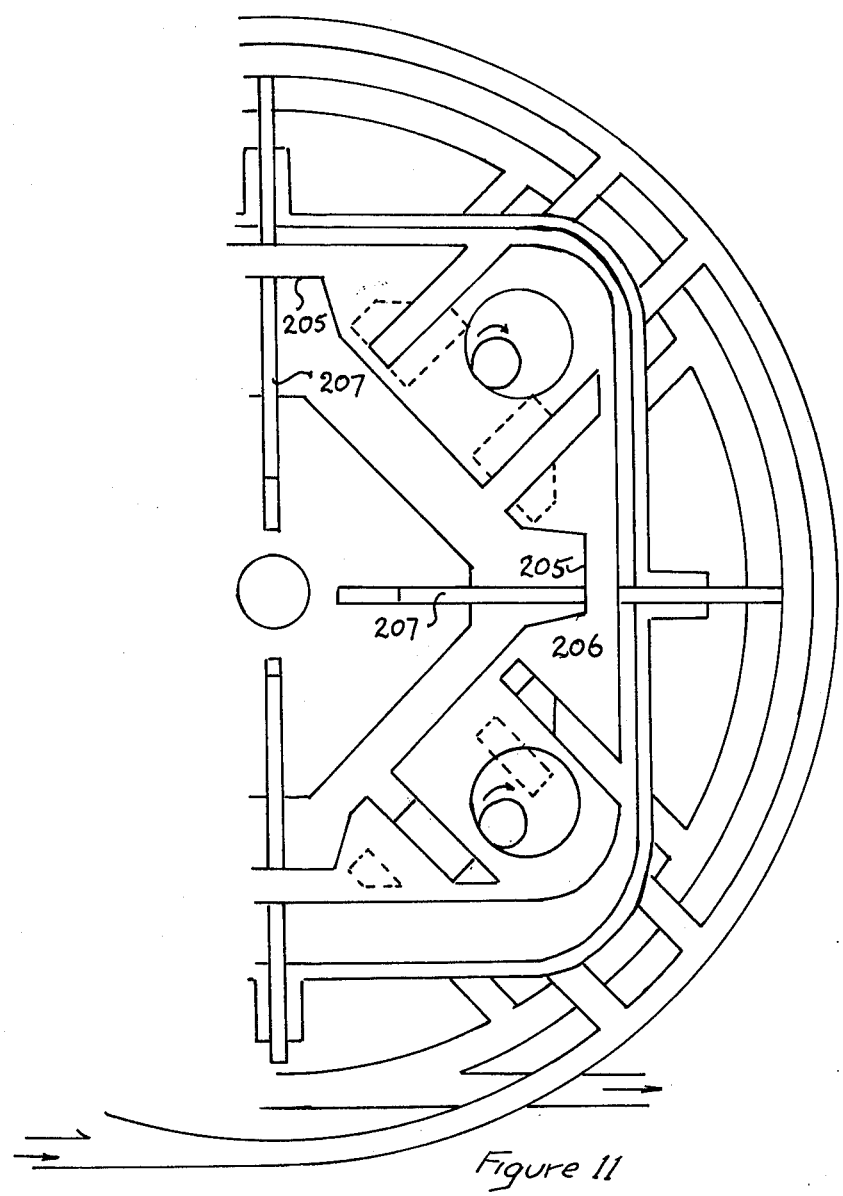
FIG. 11 shows a double acting orbital pump.

When the everted and normal orbital displacers are connected in parallel, as shown in FIG. 11, a double acting orbital pump may be obtained. The effective swept volume of this pump is the sum of the swept volumes of the normal and everted orbital displacers. In order to increase the swept volume of the everted displacer, the distance between the opposite internal faces 205 of the orbiting piston 206 in which the vanes 207 slide has been increased to a maximum. The associated increase in the clearance volume should not reduce the effectiveness in pumping incompressible fluids.

Figure 12:
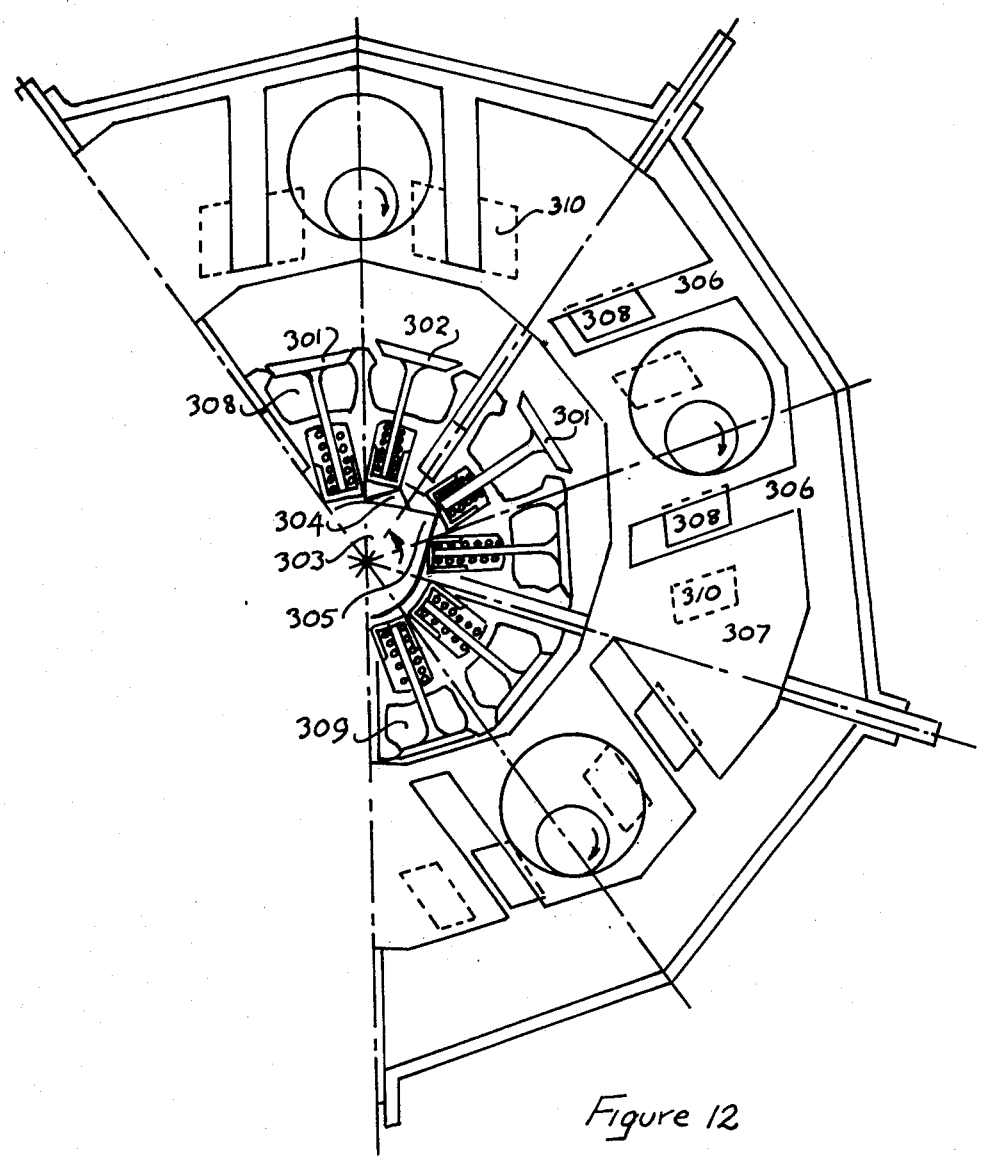
FIG. 12 shows a five chamber four stroke engine with the valves operated by a single camshaft.

A five chamber everted orbital displacer four stroke internal combustion engine is shown in FIG. 12. The stems of the inlet (301) and outlet (302) valves converge towards the axis of the displacer, a single camshaft 303 containing only an exhaust cam 304 and an inlet cam 305 used to directly open all the valves. If desired, bucket tappets could be interposed between the cams and the ends of the valve stems. Slots 306 in the orbiting piston 307 communicate the pre-compression stage with the engine via pre-compression manifold 308. Exhaust manifold 309 and inlet manifold 310 are also shown. Firing order is 13524.

Figure 13:
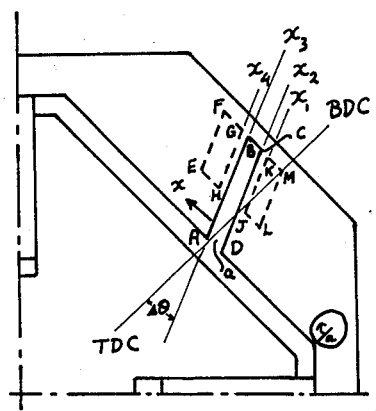
FIGS. 13 to 15 illustrate the general relationship between the position of the piston and the port openings.
Figure 14:
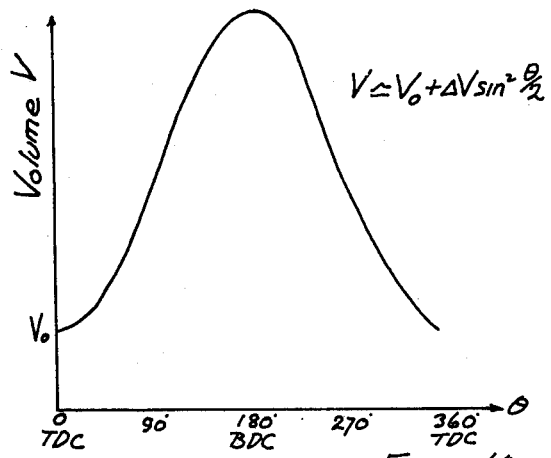
Figure 15:
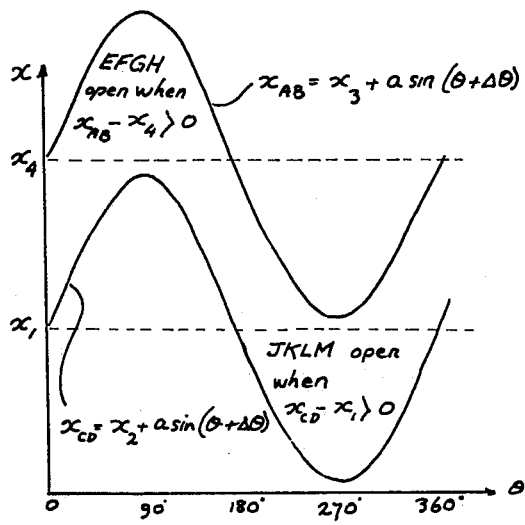

FIGS. 13 to 15 illustrate the general relationship between the position of an everted orbiting piston and the opening and closing of inlet and exhaust ports. An analogous relationship applies to a normal orbital displacer.

FIG. 13 shows a single cavity of the everted orbital displacer in the minimum volume configuration (i.e. T.D.C.). The side of the piston contains a parallel sided slot ABCD inclined at angle $\Delta\theta$ to the T.D.C./B.D.C.

line. EFGH and IJKL represent ports in the end plate of the everted orbital displacer.

FIG. 14 depicts the variation of cavity volume with respect to rotation ($\theta$) of the eccentrics from T.D.C. To a first approximation:

$$V \simeq V_o + \Delta V \sin^2\theta/2 \qquad \text{(i)}$$

where V is the volume of the cavity, $V_o$ is the clearance volume, $\Delta V$ is the swept volume of the cavity, and $\theta$ is the rotation of the eccentric from the T.D.C. position.

FIG. 15 depicts the position of the edges of the slot in the piston. The position of the left hand edge is given by:

$$x_{AB} = x_3 + a \sin(\theta + \Delta\theta) \qquad \text{(ii)}$$

Whereas the position of the right hand edge is given by:

$$x_{CD} = x_2 + a \sin(\theta + \Delta\theta) \qquad \text{(iii)}$$

Where $x_{AB}$ and $x_{CD}$ relate to the position of the left hand and right hand edges of the slot ABCD respectively, $x_2$ and $x_3$ are the respective positions of the left hand and right hand edges of the slot at $\theta = 0$ (i.e. T.D.C.), "$a$" is the throw of the eccentrics and $\Delta\theta$ is the inclination of the edges of the slot with respect to the T.D.C./B.D.C. line.

Hence the degree of opening of the port EFGH is given by:

$$x_{AB} = x_4 = x_3 - x_4 + a \sin(\theta + \Delta G) \qquad \text{(iv)}$$

whereas the degree of opening of the port IJKL is given by:

$$x_1 - x_{CD} = x_1 - x_2 + a \sin(\theta + \Delta\theta) \qquad \text{(v)}$$

The ports are closed when the degree of opening is equal to or less than zero.

The asymmetric port timing of the everted two stroke engine can be explained in terms of equation (iv). For the exhaust and transfer ports $\Delta\theta$ equals 105° and 75° respectively. Thus the maximum opening of the exhaust port precedes that of the transfer port by 30°. Even greater asymmetry is possible if the effects of the 150° corners are used to advantage.

We claim:

1. An everted orbital displacer comprising a housing having a plurality of working cavities defined by an external peripheral wall of a stationary internal housing and opposed stationary end walls, and an internal peripheral surface of an orbiting piston, said piston being supported by three or more eccentrics so that rotation of said eccentrics is accompanied by orbital motion of said piston and a change in volume of each of said working cavities, radially disposed vanes sliding in slots in the internal housing and grooves in the end plates and slidably connected to said piston whereby orbital motion of said piston causes said vanes to execute simple harmonic motion, and ports disposed in said outer housing to enable fluid to be introduced to and exhausted from said working cavities as the eccentrics rotate.

2. An everted orbital displacer as claimed in claim 1 wherein slots are cut in the orbiting piston, said slots being inclined in the orbital plane at an angle $\Delta\theta$ to the line joining the T.D.C. and B.D.C. positions of the orbiting piston with respect to each working cavity and acting as valves to expose ports in one or both end plates upon rotation of the eccentrics such that maximum port opening of either the inlet or outlet port occurs at 90°+$\Delta\theta$ before T.D.C. and the maximum opening of the other port, either outlet or inlet respectively occurs at 90°−$\Delta\theta$ after T.D.C., including the case where any straight peripheral edge of the orbiting piston constitutes half a slot available to open and close a port.

3. An everted displacer as claimed in claim 1 wherein half the total weight of the vanes is added to the weight of the piston to be balanced by weights diametrically opposite the throw of the eccentrics, the product of the mass of balance weights and their effective radius of action is equal to the product of half the total weight of the vanes and the throw of the eccentrics.

4. An everted displacer as claimed in claim 1 wherein the simple harmonic (sinusoidal) motion of the vanes is used to pump fluid, either gaseous or liquid, through the displacer.

5. The combination of the everted orbital displacer as claimed in claim 1 within a normal orbital displacer the combination being formed by extending the vanes past the outer surface of the orbiting piston, the working cavities of the normal displacer being defined by the stationary inner wall of the housing, the opposed end walls, the extended vanes and the external peripheral surface of the orbiting piston.

6. The combination as claimed in claim 5 wherein the outlet ports of one of the two displacers are connected in series to the inlet ports of the other, said one displacer acting as a pre-compressor or supercharger for the other which is the basis of an internal combustion engine.

7. The combination as claimed in claim 5 wherein the ports are located and shaped in such a way that when used as a 2 stroke engine, asymmetric port timing occurs.

8. The combination as claimed in claim 5 wherein the outlet ports of the normal displacer cavities are connected to the inlet ports of the everted displacer cavities whose volume variation is 180° out of phase with respect to said normal displacer cavities, so that the normal displacer acts as the pre-compression stage for the 2 stroke motor formed by the everted displacer.

9. A modification of the combination as claimed in claim 8 wherein the outlet ports of the pre-compression cavities are connected to the inlet ports of the everted orbital power cavities whose variation in volume is approximately 90° behind that of the associated pre-compression cavities so that each pre-compression cavity displaces fuel/air mixture progressively into the power cavity or combustion space while the latter is around B.D.C.

* * * * *